(No Model.)
G. REHFUSS.
DRILL CHUCK.
No. 256,739. Patented Apr. 18, 1882.
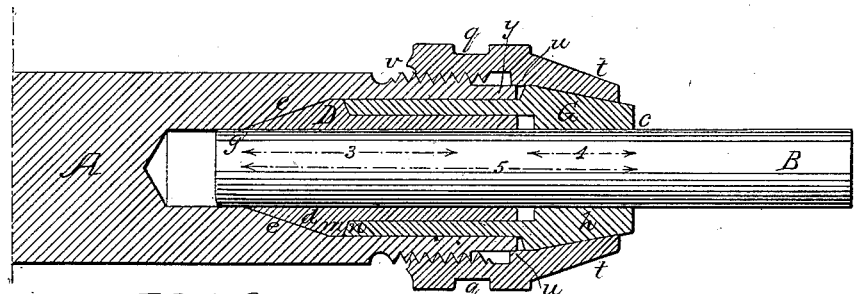
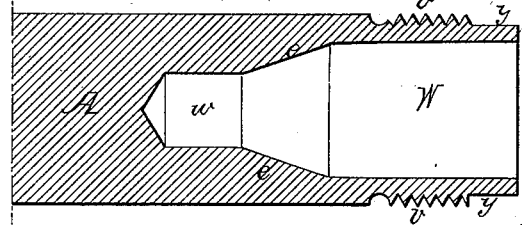
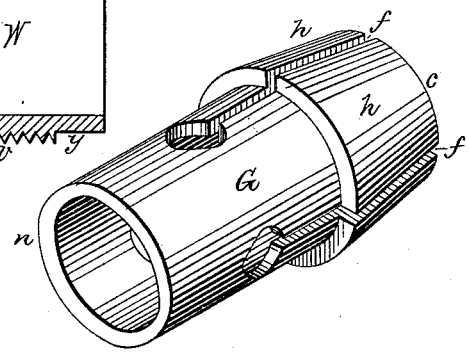
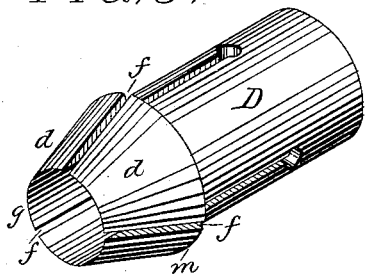
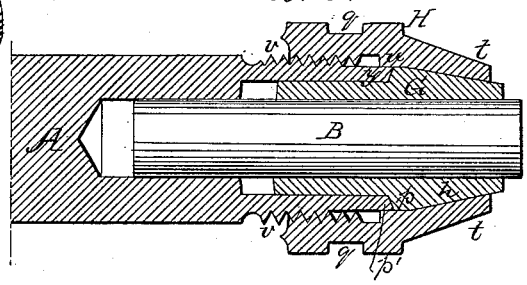
Witnesses:
David S. Williams
Harry Drury
Inventor
George Rehfuss
by his Attorneys
Howson and Son

United States Patent Office.

GEORGE REHFUSS, OF PHILADELPHIA, PA., ASSIGNOR TO HIMSELF, JOHN GEORGE REHFUSS, AND MARTIN O. REHFUSS, ALL OF SAME PLACE.

DRILL-CHUCK.

SPECIFICATION forming part of Letters Patent No. 256,739, dated April 18, 1882.

Application filed December 22, 1881. (No model.)

*To all whom it may concern:*

Be it known that I, GEORGE REHFUSS, a citizen of the United States, residing in Philadelphia, Pennsylvania, have invented certain Improvements in Drill-Chucks, of which the following is a specification.

My invention relates to that class of chucks in which elastic jaws are caused to grip the stem of a drilling or other tool by forcing the conical end of a nut adapted to the threaded body of the chuck against the said jaws, my improved chuck being constructed in the peculiar manner fully described hereinafter, with the view of firmly gripping the cylindrical stem of a tool or instrument, and for the purpose of maintaining the truth of the several parts of the chuck and of the said stem of the tool concentrically in respect to each other.

In the accompanying drawings, Figure 1 is a sectional view of my improved chuck; Fig. 2, a section of the body of the chuck; Figs. 3 and 4, perspective views of the slotted sleeves detached from the body, and Fig. 5 a view of the chuck with a single sleeve.

A represents the body of the chuck, which may be constructed in any suitable manner for attachment to the spindle of the head-stock of a lathe such as is used by dentists, jewelers, and others; or the body of the chuck may form part of the lathe-spindle, or part of the spindle of a polishing, grinding, or drilling machine; and B is the cylindrical stem of any tool or instrument adapted to the chuck.

It should be understood in the outset that the different tools which have to be confined to the chuck must have stems of the same or nearly the same diameter.

The body A of the chuck has a recess, W, for receiving the sleeves D and G, the former having a conical termination, $d$, which bears against the conical shoulder $e$ in the said recess, the internal diameter of the sleeve being such that when not under end pressure it will freely admit the stem B, for slits $f$ (three in the present instance) are made in the sleeve to form jaws for tightly gripping the said stem, as explained hereinafter.

The recess W in the spindle is preferably continued at $w$ beyond the conical shoulder $e$, so that the stem B may extend into this continuation of the recess; or the spindle may have an opening throughout its entire length, if desired.

The cylindrical portion of the sleeve D is arranged to fit loosely within the cylindrical portion of the outer sleeve, G, which has a conical termination, $h$, and slits $f$, similar to those of the sleeve D, the end of the sleeve G being beveled and adapted to bear against the beveled shoulder $m$ on the inner sleeve, D. These beveled bearings are important features of my invention, as will be seen hereinafter.

The nut H has a cylindrical portion, $q$, and a conical portion, $t$, the interior of the latter being adapted to the conical termination $h$ of the sleeve G. The cylindrical portion of the nut is threaded internally, and is adapted to the screw-thread $v$ on the body of the chuck. This screw-thread, however, does not extend to the end of the body, a portion, $y$, of the latter being plain, and this plain portion is arranged to fit very accurately in the portion $u$ of the nut. When this nut is screwed tightly onto the body of the chuck the slotted portion of the sleeve G must necessarily be contracted simultaneously with the contraction of the slotted portion of the sleeve D, and hence the stem B must be gripped between two sets of jaws.

It should be here understood that a chuck of the class to which my invention relates has been made with a sleeve having jaws at both ends; but the two sets of jaws on one sleeve involved the necessity of making the latter of great length, in order that the jaws might have the desired elasticity, and the long sleeve demanded such a projection of the nut and body of the chuck as to cause unsteadiness—a defect which I obviate by making one set of jaws on one sleeve and another set on another sleeve and adapting a portion of one to fit into the other, as described.

It will be seen that the slots in the sleeves are so long that the sleeve D can be contracted throughout the greater portion of its length, as indicated by the dotted line 3, Fig. 1, and the sleeve G throughout the length indicated by the dotted line 4, so that the stem will be gripped from the end $c$ of the sleeve G to the end $g$ of the sleeve D, or to the extent indicated by the dotted line 5, the gripping being of course more determined at the conical portions of the sleeves, but, owing to the length of the slots, having more or less effect throughout the length indicated.

It is important that the nut H should always be concentrically true on the body of the chuck, and reliance cannot always be placed on screw-threads for the attainment of this desired truth; hence the snug fitting previously referred to of the portion $u$ of the nut on the plain portion $y$ of the body of the chuck, which insures the truth of the nut, even if there should be a slight looseness of the screw. When the nut is screwed tight and end-pressure is applied to the sleeves the beveled bearings $m$ $n$ tend to maintain the sleeves concentrically true in respect to each other and to the body of the chuck. In other words, the beveled bearings have a tendency under end-pressure to center the sleeves and stem B, and thus counteract the tendency which the sleeves might have to get out of truth when contracted.

In constructing a chuck in which the gripping of an extended portion of the stem of the tool is not needed there may be but one slotted sleeve, as shown in Fig. 5; but in this case also a portion, $u$, of the nut overlaps and fits truly on the plain end of the body of the chuck, for reasons above given; and I also prefer in this instance to bevel the shoulder $p$ of the sleeve and adapt it to the beveled end $p'$ of the body.

I claim as my invention—

1. A chuck in which the body A, having a threaded portion, $v$, and at and near its end a plain cylindrical portion, $y$, is combined with a slotted sleeve and with a nut adapted to the conical portion of the sleeve and to the threaded portion of the body, and constructed to fit snugly on and overlap the plain cylindrical portion $y$ of the said body, all substantially as set forth.

2. The combination of the threaded body of the chuck and its beveled end $p'$ with a split sleeve having a beveled shoulder, $p$, adapted to the beveled end of the body, and with the nut H, substantially as set forth.

3. A chuck in which two slotted sleeves, D and G, the cylindrical portion of one fitting into that of the other and each having a conical termination, are combined with the body A and nut H, substantially as set forth.

4. The combination of the slotted sleeve D, having a conical termination, $d$, and beveled shoulder $m$, the slotted sleeve G, having a beveled end, $n$, adapted to the said beveled shoulder of the sleeve D, the body A, and the nut H, all substantially as specified.

In testimony whereof I have signed my name to this specification in the presence of two subscribing witnesses.

GEORGE REHFUSS.

Witnesses:
HARRY DRURY,
HARRY SMITH.